N. F. Mathewson.
Tedder.
No. 88314  Patented Mar. 30, 1869
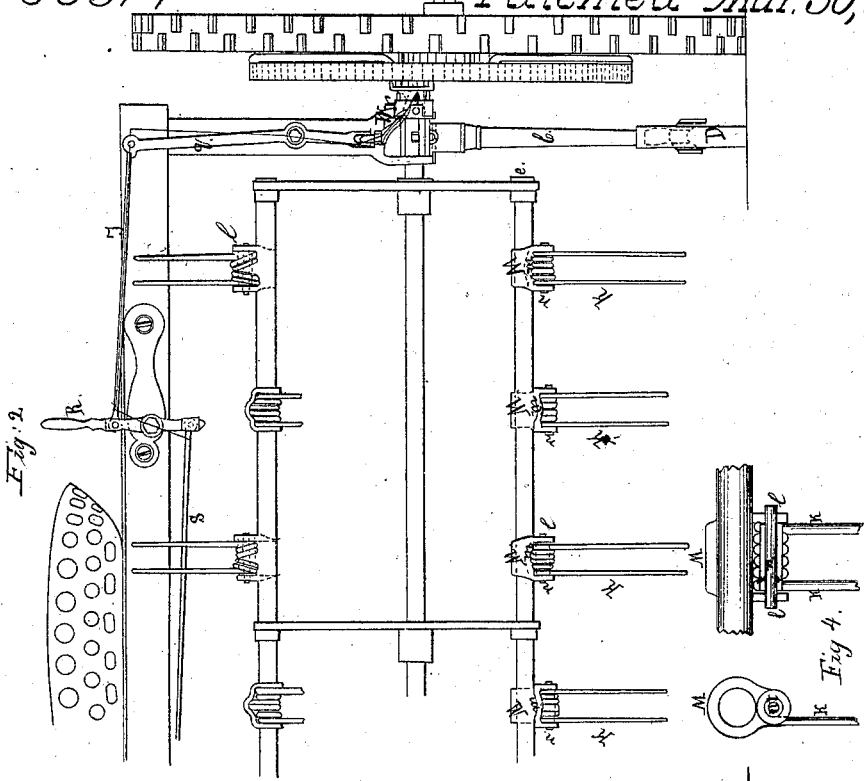
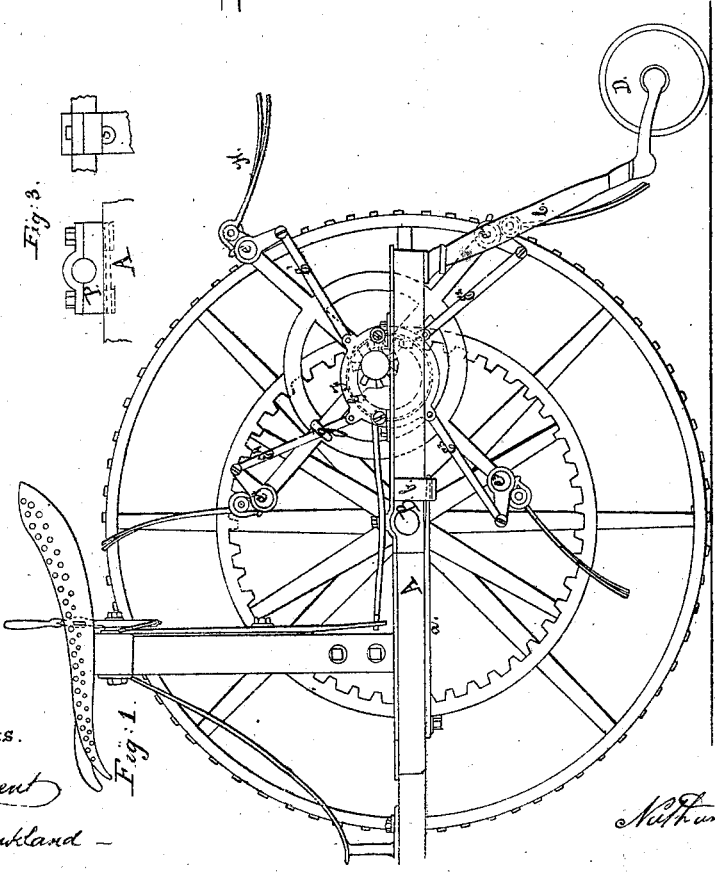
WITNESSES.
W. B. Vincent
J. H. Frankland
INVENTOR.
Nathan F. Mathewson

UNITED STATES PATENT OFFICE.

NATHAN F. MATHEWSON, OF BARRINGTON, RHODE ISLAND.

IMPROVEMENT IN HAY-SPREADERS.

Specification forming part of Letters Patent No. 88,314, dated March 30, 1869.

*To all whom it may concern:*

Be it known that I, NATHAN F. MATHEWSON, of Barrington, in the county of Bristol, in the State of Rhode Island, have invented certain new and useful Improvements in Hay-Spreading Machines; and I do hereby declare that the following specification, taken in connection with the drawings, making a part of the same, is a full, clear, and exact description thereof.

Figure 1 is an end view. Fig. 2 is a rear view. Fig. 3 is a view of the journal-box detached.

The object of my invention in hay-spreading machines is to make them more simple in their construction than others now in use, and, consequently, more durable and less likely to get out of repair, and, at the same time, attain in their operation a degree of perfection hitherto unreached; and consists in the improvements hereinafter described and claimed.

Machines of this class have usually been defective in the following particulars: first, the manner of constructing the frame, so that the machine will adapt itself to the unevenness of the ground; second, the manner of constructing and attaching the forks to the reel; third, the construction of the journal-boxes.

In my improved machine the frame A, Fig. 1, is hinged or jointed together at the point B, (the axle forming the pin,) and provided with a spring, $a$, upon its under side, and strap $b$, so that whenever the machine passes over a hollow place in the ground the weight of the parts overcomes the resistance of the spring $a$, and the rear portion of the frame A, which bears the reel and forks, is allowed to drop, by reason of the hinge B, until the swivel-wheel D rests upon the ground. Thus the forks are at all times at the same distance from the ground, and the machine enabled to perform its allotted work upon an uneven surface in a thorough manner.

The post C and wheel D are not absolutely necessary to my invention, but may be dispensed with at pleasure, as the joint B and spring $a$ will not permit the forks to strike the ground at any time with sufficient force to result in an injury to the machine.

In order that the machine should release the hay at the proper time, it becomes necessary that the ends of the tines should be compelled to drop at a certain point in the revolution of the reel to which they are attached.

To effect this I attach the fork-heads firmly in the construction of my machine to the rods which compose the reel, and connect each rod at one end, by means of cranks $E^1$ $E^2$ $E$ $E^4$, to the collar F, which revolves with the reel upon an eccentric, G, so that in the revolution of the reel, as each rod reaches the position of the rod $e'$, it is slightly turned by the action of the eccentric and crank, which drops the points of the tines to the position of the tines H, and the hay slides off, the stroke of the cranks being regulated by the strap $g$.

In my machine the fork consists of four parts, a head-piece, M, constructed with a lip, $m$, the tines $k$, a hollow tube, $t$, and a bolt, $n$. The head-piece M is firmly attached to the rod $e$, after which the tines, having first been coiled around a hollow tube, are inserted between the ears $l$ of the same, and secured in place by means of the bolt $n$ passing through the tube and ears of the head-piece M. The ends of the tines are received and held by a lip, $m$, upon the head, the cylinder or tube being used to prevent the tines from bending, though not detracting from their capacity to yield. Thus, when it becomes necessary to put in a new tine, the bolt $n$ is removed, the tines K taken out, and the new one substituted in a few moments' time.

It will be noticed, perhaps, that in many instances, as the machine passes over uneven ground, the hinges in the frame hereinbefore described may not be called upon to act both at the same time, and that while one wheel rests in a hollow place the other may be upon level ground, the effect of which would be to cramp the journal in its box. To avoid this difficulty I construct a journal-box, P, Fig. 3, the bottom of which is hinged to the frame A and adjusts itself to its journal at all times.

What I claim as my invention, and desire to secure by Letters Patent, is—

1. The combination of the hinged frame A, spring $a$, and strap $b$, the whole constructed and arranged substantially as described, for the purposes specified.

2. The combination of the hinged frame A, spring $a$, post C, and wheel D, for the purposes specified.

3. The combination of the head-piece M, tines K, bolt $n$, and hollow tube $t$, the whole constructed as described, for the purposes specified.

4. The hinging of the journal-box P to the frame A, for the purposes specified.

NATHAN F. MATHEWSON.

Witnesses:
W. B. VINCENT,
J. H. SHANKLAND.